Patented Sept. 13, 1949

2,482,048

UNITED STATES PATENT OFFICE 2,482,048

VINYL CHLORIDE-CONTAINING POLYMERS HAVING A HIGH STABILITY AGAINST THERMAL DECOMPOSITION

Thurman V. Williams, Niagara Falls, N. Y., assignor to E. I. du Pont de Nemours & Company, Wilmington, Del., a corporation of Delaware No Drawing. Application March 11, 1947, Serial No. 734,000

8 Claims. (Cl. 260—92.8)

This invention relates to the production of vinyl chloride-containing polymers, and more particularly it relates to a new and improved process of the production of such polymers having a highly desirable stability against thermal decomposition. This invention is particularly applicable to vinyl chloride-containing ploymers containing at least 50%, by weight, vinyl chloride ($CH_2=CHCL$) units, i. e., polymers obtained by the polymerization solely of vinyl chloride (commonly referred to as polyvinyl chloride) and polymers obtained by the conjoint polymerization of vinyl chloride and another polymerizable substance and in which the vinyl chloride constitutes 50%, by weight, of the resulting copolymer.

This application is a continuation-in-part of my copending application Serial No. 563,304 filed November 13, 1944, now abandoned.

Vinyl chloride-containing polymers containing at least 50% by weight of vinyl chloride units are subject to thermal decomposition when heat processed above the softening point thereof in the formation of various articles, for example, when heat molded, injection molded, heat calendered and the like. These polymers are particularly subject to thermal decomposition, as evidenced by discoloration, when they contain even trace amounts of certain metal salts, particularly iron salts.

In order to isolate vinyl chloride-containing polymers from aqueous dispersions thereof, several methods have proven workable and are known in the art. One method of isolation involves spray-drying of the dispersion. In this process, the aqueous polymer dispersion is sprayed into a jet of combustion gases. The temperature of these gases is such that the water contained in the dispersion is rapidly vaporized to superheated steam. The dry polymer is then separated from the gaseous phase in a so-called "cyclone separator." It will be evident that this process results in the removal of none of the non-volatile impurities in the dispersion. Another method of isolation involves drum drying. By this process, the aqueous dispersion is run into the gap between two heated rolls. The temperature and speed of the rolls are adjusted so that near the end of the revolution the water has been volatilized. The solids are scraped off the roll at this point. As in the spray-drying process, none of the impurities are removed by drum drying.

Where it is desirable to obtain a polymer materially free of dispersing agent, water-soluble salts, etc., the aqueous dispersion of the vinyl chloride-containing polymer is isolated by coagulation with an electrolyte. Numerous acid and salt electrolytes have been used for this purpose. The use of an acid, for example, sulfuric acid, as the coagulant is objectionable in that it results in the production of a soft sticky mass which is very difficult to reslurry with added water. It is, therefore, preferred to use, as the coagulant, a water-soluble metal salt electrolyte which will not form a water-insoluble precipitate with acids which are present in the dispersion.

The use of such water-soluble metal salt electrolytes, as coagulants, will under normal circumstances prevent removal of objectionable quantities of iron, manganese, nickel and copper salt impurities which may be present in the resin dispersion. The presence of iron, manganese, nickel or copper salt impurities in the final resin product will enhance the thermal instability of the resin and they are therefore, highly objectionable. Furthermore, when insoluble hydroxide-forming, water-soluble metal salts, for example, aluminum salts, are used as the coagulants, insoluble hydroxides will be formed in the coagulated mass. Although aluminum hydroxide may not add to the inherent thermal instability of the resin, it is generally incompatible with the fused resin and results in haze in unpigmented resin formulations.

It is an object of the present invention to provide a new and improved process for the production of vinyl chloride-containing polymers containing at least 50% by weight vinyl chloride units.

It is another object of this invention to produce vinyl chloride-containing polymers containing at least 50% by weight vinyl chloride units which will have an improved stability against thermal decomposition.

It is still another object of this invention to provide a process for treating an aqueous dispersion of a vinyl chloride-containing polymer which will solubilize inorganic impurities therein and permit their removal by washing with water.

It is another object of this invention to provide a process for the production of vinyl chloride-containing resins from an aqueous dispersion thereof, which process will readily remove iron, manganese, nickel or copper, or aluminum impurities which may otherwise remain in the resin product.

Other objects of the invention will appear hereinafter.

The objects of the invention may be accomplished, in general, by adding to an aqueous dispersion of a vinyl chloride-containing resin containing at least 50% by weight vinyl chloride units, sufficient water-soluble acid to reduce the pH value of the dispersion to such a level that inorganic impurities will be in solution and remain in solution during subsequent coagulation, filtration and washing steps. The polymer is then coagulated from the dispersion by means of a water-soluble metal salt which will not form a water-insoluble salt with any acid present in the polymer dispersion, and is then filtered, washed, neutralized, if necessary, and dried.

It has now been found that if a water-soluble acid, preferably a mineral acid, is added to an aqueous dispersion of a vinyl chloride-containing polymer containing at least 50% by weight of vinyl chloride units and containing a dispersing agent which is not materially affected by said added acid to demulsify the dispersion in an amount insufficient to coagulate the polymer but sufficient to reduce the pH value below 2, deleterious metal salts contained in the dispersion will remain in solution after coagulation with said water-soluble metal salt electrolyte. The polymer can, after coagulation, be washed with water to remove objectionable salts contained in the coagulated polymer. Furthermore, by this process, the coagulated polymer will have a granular form which is readily re-dispersed by addition of water.

As above stated, the aqueous vinyl chloride-containing polymer dispersion should contain, as the dispersing agent therein, a dispersing agent which is not materially affected by the step of acidification to demulsify the dispersion, i. e., the dispersing agent must be stable against decomposition at a pH below 2. As examples of such dispersing agents, the following may be named: sodium alkyl sulfates containing 7 to 18 carbon atoms, for example sodium lauryl sulfate, sodium cetyl sulfate or sodium myristyl sulfate; sodium alkyl sulfonates, i. e., compounds having the general formula

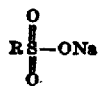

in which R designates an alkyl radical having between 12 and 18 carbon atoms.

The acid used in lowering the pH value of the aqueous polymer dispersion should, of course, be sufficiently strong to readily lower the pH value below 2. The following are examples of acids which may be used for this purpose: hydrochloric acid, sulfuric acid, acetic acid, and para-toluene sulfonic acid. Preferably, hydrochloric or sulfuric acid is used in the lowering of the pH value.

Aqueous dispersions of vinyl chloride-containing polymers are usually prepared by methods which will produce dispersions having a pH value of between about 2.5 to 4.0. With such dispersions the acid can be added to lower the pH value to around zero without coagulating the polymer. However, in the case of aqueous polymer dispersions having a high pH, for example, 6 to 10, the pH value may only be lowered to about 1.0 or even 1.5 to avoid precipitating the polymer.

As the water-soluble metal salt electrolyte, any metal salt may be used which will not form an insoluble salt with acid which is present in the dispersion. For example, aluminum chloride, aluminum sulfate, sodium or potassium chloride, or sodium or potassium acetate may be used for this purpose. Water-soluble aluminum salts are preferred. When the dispersion contains sulfate ions, barium or calcium salts cannot be used since they would form insoluble salts in the mass.

The invention is applicable to vinyl chloride polymers consisting entirely of vinyl chloride units, i. e., polyvinyl chloride, or it is applicable to copolymers and interpolymers in which at least 50% of the polymer consists of vinyl chloride units and the remainder consists of other polymer units. As examples of copolymers which will be stabilized in accordance with the present invention, the following may be named: vinyl chloride-fumaric ester copolymers, vinyl chloride-vinyl acetate copolymers, vinyl chloride-vinylidene chloride copolymers, vinyl chloride-vinyl cyanide copolymers, vinyl chloride-acrylic ester copolymers and vinyl chloride-methacrylic ester copolymers. Preferably, the polymers to be treated in accordance with this invention are those prepared from monomers which contain only one ethylenic double bond.

The following examples, illustrate, in specific detail, certain preferred processes for carrying out the process of the present invention, it being understood thaat the invention is not limited to the details set forth in the examples.

*Example I*

Aqueous dispersion of a 95-5 vinyl chloride-diethyl fumarate copolymer of 30% solids pH=2.9 containing as the dispersing agent, 1% by weight of sodium lauryl sulfate of the copolymer _____g__ 500
Aqueous hydrochloric acid solution sufficient to reduce the pH of the polymer dispersion to 2.0–1.0 _____N__ 10
Aluminum sulfate solution. 1 N. aqueous ammonium hydroxide _____ per cent__ 10

The polymer dispersion was prepared by emulsion polymerization of the mixed monomers. The pH of the resulting dispersion was 2.9. The dilute hydrochloric acid was added slowly to the dispersion with agitation. When the pH had reached 1.4, 25 cc. of the aluminum sulfate was added. The dispersion immediately set up to a friable mass that appeared to be nearly dry. Sufficient water was added to result in a workable slurry, and the solids were separated off and washed well with water. They were then reslurried in dilute ammonium hydroxide, filtered out, again thoroughly washed with water and dried at atmospheric pressure and 65° C. for five hours. Approximately 147 g. dry, white resin powder was obtained. When this powder was molded for 2 minutes at 165° C. and 1000 lbs. per sq. in. pressure, a very light amber sheet resulted.

*Example II*

A second sample of the polymer dispersion of Example I was coagulated exactly according to the scheme outlined in that example except that the pH was not lowered. A molding of the isolated resin was light brown, with green blotches, when pressed for 2 minutes at 165° C. and 1000 lbs. per sq. in. pressure.

*Example III*

A third sample of the polymer dispersion of Example I was coagulated as outlined in that example except that no hydrochloric acid was added; instead the pH was raised to 8.0 with dilute ammonium hydroxide prior to addition of aluminum sulfate. A molding of the resin isolated by this procedure was an uneven brown color comparing on an average to the Hellige varnish color standard No. 15. This sheet was not quite clear.

Example IV

Aqueous dispersion of polyvinyl chloride, 36% solids pH=2.7 containing as a dispersing agent, 0.75% by weight of sodium lauryl sulfate of the polymer _____ g__ 500
Aqueous hydrochloric acid solution sufficient to reduce the pH of the polymer dispersion to 2.0–1.0 _____ N__ 5
Aluminum sulfate solution _____per cent__ 10
Aqueous ammonium hydroxide _____ N__ 1

This dispersion was coagulated according to the scheme outlined in Example I. A sheet prepared by pressing the powder for two minutes at 165° C. and 1000 lbs. per sq. in. pressure was clear amber. As in Examples II and III, coagulations carried out at pH=2.7 and 8 respectively yielded resins which were progressively less stable to thermal decomposition.

Example V

Aqueous dispersion of a 95–5 vinyl chloride methyl acrylate interpolymer. Solids content; 20%, pH: 20.75 containing as a dispersing agent, sodium white oil sulfonate _____ g__ 500
Aqueous hydrochloric acid solution sufficient to reduce the pH of the dispersion to 2.0–1.0 _____ N__ 5

When isolated according to the scheme outlined in Example I, this resin yielded a sparkingly clear film by pressing at 165° C. and 1000 lbs. per sq. in. for 2 minutes. It was light amber in color. The resin resulting from basic coagulation as in Example III yielded a brown film with greenish blotches when pressed at 165° C. and 1000 per sq. in. in for 2 minutes.

Since it is obvious that many changes and modifications can be made in the above described details without departing from the nature and spirit of the invention, it is to be understood that the invention is not to be limited to said details except as set forth in the appended claims.

What is claimed is:

1. The process of producing a vinyl chloride-containing polymer having a high stability against thermal decomposition which comprises adding to an aqueous dispersion of a vinyl chloride-containing polymer taken from the group consisting of polyvinyl chloride, vinyl chloride-fumaric ester copolymers, vinyl chloride-vinyl acetate copolymers, vinyl chloride-vinylidene chloride copolymers, vinyl chloride-vinyl cyanide copolymers, vinyl chloride-acrylic ester copolymers and vinyl chloride-methacrylic ester copolymers, said polymer containing at least 50%, by weight, vinyl chloride units and containing as the dispersing means therein a dispersing agent which is stable at a pH below 2.0, sufficient water-soluble acid taken from the group consisting of hydrochloric acid, sulfuric acid, acetic acid, and para-toluene sulfonic acid to lower the pH value of the dispersion to less than 2.0 but insufficient to coagulate the polymer from the dispersion, adding to said dispersion, in sufficient amount to coagulate said polymer, a water-soluble metal salt which will not form an insoluble salt with acid present in said dispersion, and washing said coagulated polymer.

2. The process as defined in claim 1 in which the vinyl chloride-containing polymer is polyvinyl chloride.

3. The process of producing a vinyl chloride-containing polymer having a high stability against thermal decomposition which comprises adding to an aqueous dispersion of a vinyl chloride-containing polymer taken from the group consisting of polyvinyl chloride, vinyl chloride-fumaric ester copolymers, vinyl chloride-vinyl acetate copolymers, vinyl chloride-vinylidene chloride copolymers, vinyl chloride-vinyl cyanide copolymers, vinyl chloride-acrylic ester copolymers, and vinyl chloride-methacrylic ester copolymers, said polymer containing at least 50%, by weight, vinyl chloride units and containing as the dispersing means therein a dispersing agent which is stable at a pH below 2.0, sufficient sulfuric acid to lower the pH value of the dispersion to less than 2.0 but insufficient to coagulate the polymer from the dispersion, adding to said dispersion, in sufficient amount to coagulate said polymer, a water-soluble metal salt which will not form an insoluble salt with acid present in said dispersion, and washing said coagulated polymer with water.

4. The process of producing a vinyl chloride-containing polymer having a high stability against thermal decomposition which comprises adding to an aqueous dispersion of a vinyl chloride-containing polymer taken from the group consisting of polyvinyl chloride, vinyl chloride-fumaric ester copolymers, vinyl chloride-vinyl acetate copolymers, vinyl chloride-vinylidene chloride copolymers, vinyl chloride-vinyl cyanide copolymers, vinyl chloride-acrylic ester copolymers, and vinyl chloride-methacrylic ester copolymers, said polymer containing at least 50%, by weight, vinyl chloride units and containing as the dispersing means therein a dispersing agent which is stable at a pH below 2.0, sufficient hydrochloric acid to lower the pH value of the dispersion to less than 2.0 but insufficient to coagulate the polymer from the dispersion, adding to said dispersion, in sufficient amount to coagulate said polymer, a water-soluble metal salt which will not form an insoluble salt with acid present in said dispersion, and washing said coagulated polymer with water.

5. The process of producing a vinyl chloride-containing polymer having a high stability against thermal decomposition which comprises adding to an aqueous dispersion of a vinyl chloride-containing polymer taken from the group consisting of polyvinyl chloride, vinyl chloride-fumaric ester copolymers, vinyl chloride-vinyl acetate copolymers, vinyl chloride-vinylidene chloride copolymers, vinyl chloride-vinyl cyanide copolymers, vinyl chloride-acrylic ester copolymers, and vinyl chloride-methacrylic ester copolymers, said polymer containing at least 50%, by weight, vinyl chloride units and containing as the dispersing means therein a dispersing agent which is stable at a pH below 2.0, sufficient water-soluble acid taken from the group consisting of hydrochloric acid, sulfuric acid, acetic acid, and para-toluene sulfonic acid to lower the pH value of the dispersion to less than 2.0 but insufficient to coagulate the polymer from the dispersion, adding to said dispersion, in sufficient amount to coagulate said polymer, a water-soluble aluminum salt, and washing said coagulated polymer with water.

6. The process of producing a vinyl chloride-containing polymer, having a high stability against thermal decomposition which comprises adding to an aqueous dispersion of a vinyl chloride-containing polymer taken from the group consisting of polyvinyl chloride, vinyl chloride-fumaric ester copolymers, vinyl chloride-vinyl acetate copolymers, vinyl chloride-vinylidene chloride copolymers, vinyl chloride-vinyl cyanide copolymers, vinyl chloride-acrylic ester copolymers, and vinyl chloride-methacrylic ester copolymers, said polymer containing at least 50%, by weight, vinyl chloride units and containing as the dispersing means therein a dispersing agent which is stable at a pH below 2.0, sufficient water-soluble acid taken from the group consisting of hydrochloric acid, sulfuric acid, acetic acid, and para-toluene sulfonic acid to lower the pH value of the dispersion to less than 2.0 but insufficient to coagulate the polymer from the dispersion, adding to said dispersion, in sufficient amount to coagulate said polymer, aluminum sulfate and washing said coagulated polymer with water.

7. The process of producing a vinyl chloride-containing polymer, having a high stability against thermal decomposition which comprises adding to an aqueous dispersion of a vinyl chloride-containing polymer taken from the group consisting of polyvinyl chloride, vinyl chloride-fumaric ester copolymers, vinyl chloride-vinyl acetate copolymers, vinyl chloride-vinylidene chloride copolymers, vinyl chloride-vinyl cyanide copolymers, vinyl chloride-acrylic ester copolymers, and vinyl chloride-methacrylic ester copolymers, said polymer containing at least 50%, by weight, vinyl chloride units and containing as the dispersing means therein a dispersing agent which is stable at a pH below 2.0, sufficient hydrochloric acid to lower the pH value of the dispersion to less than 2.0 but insufficient to coagulate the polymer from the dispersion, adding to said dispersion, in sufficient amount to coagulate said polymer, a water-soluble aluminum salt and washing said coagulated polymer with water.

8. The process of producing a vinyl chloride-containing polymer, having a high stability against thermal decomposition which comprises adding to an aqueous dispersion a vinyl chloride-containing polymer taken from the group consisting of polyvinyl chloride, vinyl chloride-fumaric ester copolymers, vinyl chloride-vinyl acetate copolymers, vinyl chloride-vinylidene chloride copolymers, vinyl chloride-vinyl cyanide copolymers, vinyl chloride-acrylic ester copolymers, and vinyl chloride-methacrylic ester copolymers, said polymer containing at least 50%, by weight, vinyl chloride units and containing as the dispersing means therein a dispersing agent which is stable at a pH below 2.0, sufficient hydrochloric acid to lower the pH value of the dispersion to less than 2.0 but insufficient to coagulate the polymer from the dispersion, adding to said dispersion, in sufficient amount to coagulate said polymer, aluminum sulfate, and washing said coagulated polymer with water.

THURMAN V. WILLIAMS.

REFERENCES CITED

The following references are of record in the file of this patent:

UNITED STATES PATENTS

| Number | Name | Date |
|---|---|---|
| 2,382,812 | Parker | Aug. 14, 1945 |
| 2,392,756 | Mighton | June 8, 1946 |
| 2,419,122 | Cox | Apr. 15, 1947 |